July 19, 1932. A. JOSEPH 1,867,841
PROCESS AND APPARATUS FOR THE CATALYTIC CRACKING
OF PETROLEUM OILS, TAR, AND THE LIKE
Filed Dec. 22, 1928 2 Sheets-Sheet 1

INVENTOR.
Alfred Joseph
By Cameron, Kerkam and Sutton
Attorneys.

INVENTOR.
Alfred Joseph.
By Cameron, Kerkam and Sutton.
Attorneys.

Patented July 19, 1932

1,867,841

UNITED STATES PATENT OFFICE

ALFRED JOSEPH, OF ENGHEIN, FRANCE, ASSIGNOR, BY MESNE ASSIGNMENTS, TO HOUDRY PROCESS CORPORATION, OF DOVER, DELAWARE, A CORPORATION OF DELAWARE

PROCESS AND APPARATUS FOR THE CATALYTIC CRACKING OF PETROLEUM OILS, TAR, AND THE LIKE

Application filed December 22, 1928, Serial No. 328,012, and in France September 21, 1928.

This invention relates to processes and apparatus for the catalytic cracking of petroleum oils, tar, and the like.

When oils, derived either from natural petroleums or from the distillation of coals, lignites, shales etc. are cracked in the presence of a catalyst, the activity of the latter does not remain constant all the time. After a period of adaptation, the activity decreases to become approximately null by which time the catalyst ought to be regenerated. At any given moment, the degree of activity of the catalyst is determinable by the light products manufactured, these latter, in proportion to the degree to which the activity diminshes, diminishing equally in quantity and consisting more and more only of products easy to crack.

The subject of the present invention is a process and apparatus for the catalytic cracking of petroleums and other hydrocarbon products, suppressing the above disadvantages.

According to the invention, the oils being treated over a catalyst, the residual products, after removal of the light products, instead of being conducted over the same catalyst are led into a second reaction chamber charged with a catalyst at a higher degree of activity. This manner of operating can be repeated in series, any suitable number of times, variable in accordance with the products to be treated. The total number of catalyzers to be employed will depend on the volume of each, on the rate of supply of the oil to be treated and on its quality.

The process necessarily involves the employment for the vaporization of the oils, of apparatus known under the name of "vaporizers", that is to say apparatus wherein the oil is, by suitable arrangements vaporized by small quantities being subjected to complete vaporization, the vapours formed at each instant and led over the catalyst thus conserving an approximately constant composition.

The invention is illustrated by way of example on the accompanying drawings, in which Figs. 1, 2, 3 and 4 are diagrammatic representations of the plants employed.

Figure 1:
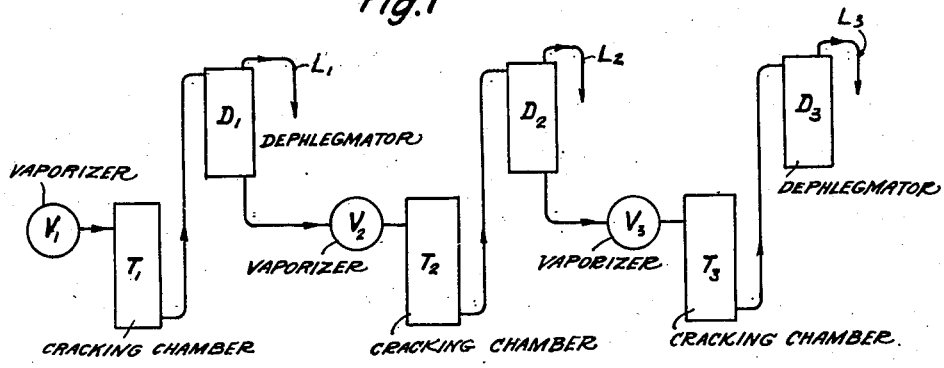

As the activity of the catalyst diminishes the more rapidly, all other things being equal, the larger the quantity of oil which it transforms, it suffices to cause an appropriate number of apparatus to be traversed in series, each composed, as shown in Fig. 1 of the annexed drawings, of a vaporizer $V^1$, a catalyst tube $T^1$ and a dephlegmator $D^1$ (three apparatus in series being shown by way of example.)

The vaporizers and tubes can be of any known construction, but the tubes $T^1$ and $T^2$ etc. are preferably constructed in accordance with the patent application Serial No. 328,011 filed by the applicant December 22, 1928.

The main cracking takes place in the tube $T^1$; the light products are separated in $D^1$ from whence they are carried off by the pipe $L^1$ to be collected elsewhere. The residual products more difficult to crack are, after vaporization at $V^2$, treated in $T^2$, then after separation of the light products out of $D^2$ by $L^2$, the first residual products are vaporized at $V^3$ and treated at $T^3$, etc.

The mass of products to be cracked is less considerable in $T^2$ than in $T^1$, in $T^3$ than in $T^2$, etc. Therefore the activity of the catalysts increases in duration from $T^1$ to $T^3$ whilst they each receive products more and more difficult to crack, a methodical cracking thus being effected.

At the end of a certain time, the activity of $T^1$ is null, which results in an absence of separation of light products in $D^1$. The products traverse $T^1$ without transformation and this latter commences to manifest itself only in $T^2$, then, only later, in $T^3$. The operation must be arrested when the total yield of the plant $T^1$—$T^2$—$T^3$ becomes less than a given value. A regeneration must then be effected in all the vaporizer and catalyzer units, during which the oil can be treated in a similar group (which can be imagined to be denoted $$T^{1'}, T^{2'}, T^{3'})$$

in active operation, whilst the group $$T^1—T^2—T^3$$

is being regenerated by any appropriate means, and vice versa.

In the arrangement which has just been described, the tube $T^1$ after its activity has fallen to zero is simply traversed by the oils to be treated. It may in certain cases be advisable to cut out the tube at the head of the operating series circuit when it is no longer active, which happens at the end of a known time and which moreover manifests itself by the disappearance of light products at the corresponding dephlegmator. The second tube then becomes the tube at the head and the tube taken out of circuit is regenerated, and then replaced after such regeneration, at the end of the path of the oil to be treated, the catalyst in the greatest state of activity having thus to treat products more and more difficult to crack. Thus a cyclic permutation of the cracking elements is effected.

Figure 2:
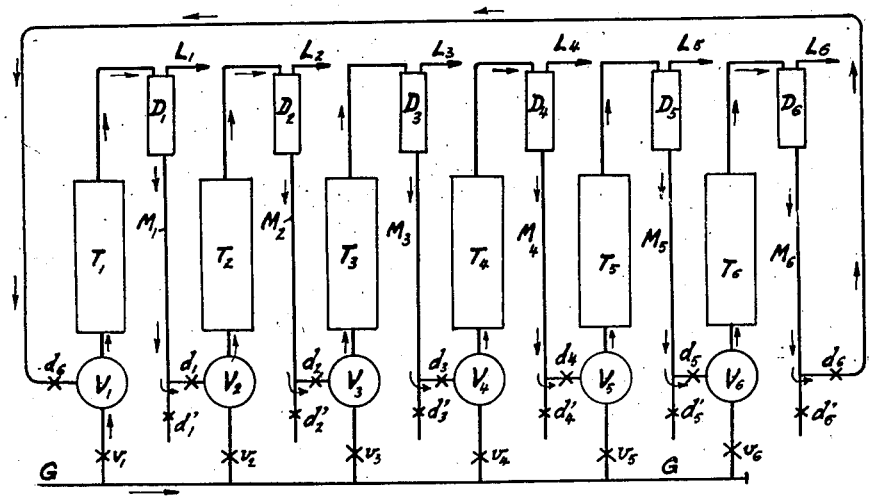

Fig. 2 shows diagrammatically a plant similar to that described and comprising six elements.

The oil is brought by a main pipe G and can be injected alternatively into the vaporizers $V^1$—$V^2$ . . . $V^6$ by means of the stop valves $v^1$—$v^2$ . . . $v^6$. The oil injected into $V^1$, for example, through $v^1$ is vaporized, traverses the catalyzer $T^1$, and then the dephlegmator $D^1$. The light products escape by $L^1$, whereas the heavy products descend by $M^1$ and can be either collected elsewhere after passing through a stop valve $$d^1_1$$

or injected into the vaporizer $V^2$ through a stop valve $d^1$. The temperature in the vaporizers $V_1$, $V_2$, etc., and in the catalytic cracking chambers $T_1$, $T_2$, etc., according to the oils treated, can vary between 400° C. and 500° C. No pressure is maintained in the system except just sufficient to cause circulation of the products.

The operation of the plant (five apparatus being in service) is as follows: All the cocks are closed, save $v^1$—$d^1$—$d^2$—$d^3$—$d^4$—$d^1_5$. The oil enters by $v^1$ into $V^1$ and follows the path $V^1$—$T^1$—$D^1$—$V^2$—$T^2$—$D^2$—$V^3$—$T^3$—$D^3$—$V^4$—$T^4$—$D^4$—$V^5$—$T^5$—$D^5$. The residual heavy products escape to elsewhere by $d^1_5$ and the light products by $L^1$—$L^2$—$L^3$—$L^4$—$L^5$.

When the catalyzer $T^1$ has become inactive, it is isolated by closing $v^1$ and $d^1$. The oil is introduced by $v^2$ into $V^2$ which becomes the leading unit of the operating series and a fresh unit $V^6$—$T^6$—$D^6$ is added to the end by closing $d^1_5$ and opening $d^5$ and $d^6$.

The catalyzer $T^1$, thus isolated is regenerated in situ. Thereafter when the catalyzer $T^2$ has become inactive, a similar operation takes place by closing $v^2$—$d^2$ and $d^1_6$ and by opening $v^3$—$d^6$ and $d^1_1$, and so on.

The arrangement adopted in Fig. 2 permits, beyond the working in series of a certain number of groups of vaporizers, catalyzers and dephlegmators as described above, the possibility of using the groups of apparatus ($V^1$—$T^1$—$D^1$—, $V^2$—$T^2$—$D^2$ . . . $V^6$—$T^6$—$D^6$) in parallel.

It has been indicated above that in using five groups of apparatus in series light products are collected after each group and a residue after the fifth group.

In certain cases, for economy, it may be advisable to treat the oils in only a restricted number of groups, one only for example, in such manner as to augment the value of the residue and diminish the quantity of the light products manufactured. In this case, the plant of Fig. 2 permits the simultaneous employment of all the groups. The cocks $d^1$—$d^2$ . . . $d^6$ will remain constantly closed and the cocks $d^1_1$—$d^1_2$, etc. . . . constantly open, the stop valves $v^1$ . . . $v^6$ can be open simultaneously and closed independently one by one during the regeneration of the respective vaporizer-catalyzer group.

It is easy to see that with easy adjustments of the piping, it is possible to obtain all desired combinations, that is to say work in series with 1—2—3—4—5, etc. groups.

As indicated above, a purifier serving to desulphurize the oils may be interposed between the catalyzer apparatus and the dephlegmator of each vaporizer-catalyzer-dephlegmator group.

Figure 3:
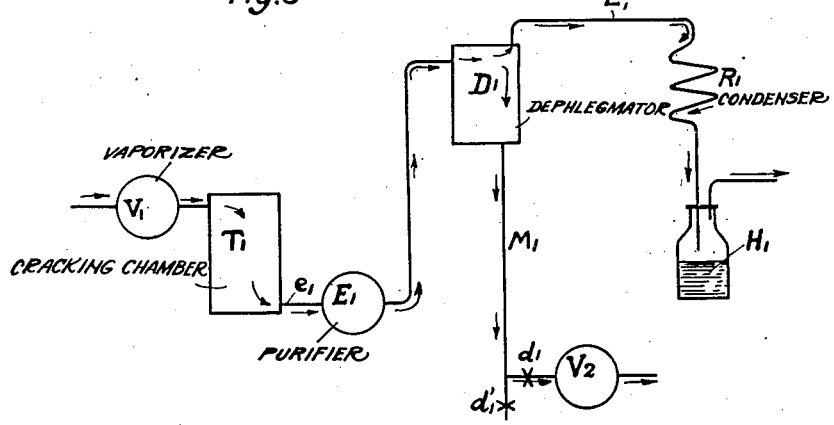
Figure 4:
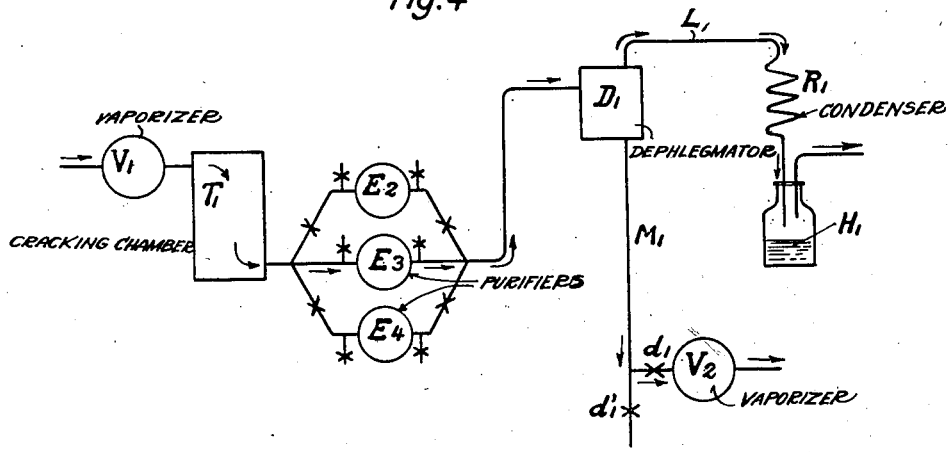

In accordance with this arrangement of the invention, the oils are as shown in Fig. 3, vaporized in a vaporizer $V^1$, then treated in a catalyzer $T^1$, but before arriving in the dephlegmator $D^1$ they traverse a purifier $E^1$ intended to retain the sulphur compounds. The purifier $E^1$ as well as the pipe $e^1$ connecting such purifier to the catalyzer $T^1$, are maintained at a temperature sufficient to avoid any condensation in $E^1$ and $e^1$, without however effecting any modification of the products, save that which is involved in the retention of the sulphur compounds.

On issuing from the purifier $E^1$, the oils are led into a dephlegmator $D^1$ from whence the light products escape by $L^1$ whereas the heavy products condense and are evacuated by the pipe $M^1$, to be either collected through the stop valve $d^1_1$, or passed into a second vaporizer $V^2$ through the stop valve $d^1$.

The purifying mass placed in the purifying apparatus $E^1$ is composed of sub-oxides, oxides or metals, nickel for example, these oxides or metals being in a finely divided state on porcelainic or other carriers, or may be incorporated in a porous carrier.

If, according to Fig. 3, there is a single purifier, its volume should be determined so that it is necessary to regenerate it only at the same time as the group $V^1$—$T^1$. However, such a single purifier apparatus $E^1$ may be replaced by two or several apparatus arranged in parallel (3 for instance) $E^2$—$E^3$—$E^4$ (in conformity with Fig. 4), provided with cocks enabling the oils to be purified through any one thereof whilst the others are undergoing regeneration.

Although the terms "first" and "last" have been applied in the claims to certain of the treating or cracking units of the whole plant, it is to be expressly understood that these terms are purely arbitrary and have been used in order to aid in the description of a structure wherein a plurality of treating units are serially connected together so as to form a closed or continuous circuit, the condensate outlet of each and every dephlegmator having a conduit connection to the vaporizer inlet of some other unit, so that the plant may be operated by a cyclic or circular permutation of the units as previously described. The claims thus describe the structure of the complete treating plant which, by virtue of the various cocks provided in the respective conduits, can be connected in any suitable manner to form an operating series of units which excludes one or more of the total number of units comprising the entire plant. When referring to any particular operating series, however, it will be understood that the "first" unit is the one to which the starting material is introduced, and the "last" one is that from which the finally uncracked residue is collected, and that by virtue of the cyclic permutation feature of the app.ratus, any one of the units of the plant may be the "first" in the operating series.

Claims:

1. In apparatus of the class described, a plant comprising three or more treating units in series, each of said units comprising a vaporizer, a catalyzer, and a dephlegmator serially connected together in the order named, conduits connecting the condensate outlet of each of said dephlegmators with the vaporizer of the next unit, including a connection between the condensate outlet of the last unit and the vaporizer of the first unit of the plant, whereby a closed circuit is formed through said units, means whereby any of said units may be disconnected from the closed circuit leaving the remaining units connected together as an operating series, and a supply line external to said circuit and having a connection to each of said vaporizers.

2. In apparatus of the class described, a plant comprising three or more treating units in series, each of said units comprising a vaporizer, a catalyzer, and a dephlegmator serially connected together in the order named, conduits connecting the condensate outlet of each of said dephlegmators with the vaporizer of the next unit including a connection between the condensate outlet of the last unit and the vaporizer of the first unit of the plant, whereby a closed circuit is formed through said units, means whereby any of said units may be disconnected from the closed circuit leaving the remaining units connected together as an operating series, a supply line external to said circuit and having a connection to each of said vaporizers, and means for withdrawing uncondensed vapors from said dephlegmators.

3. In apparatus of the class described, a plant comprising three or more treating units in series, each of said units comprising a vaporizer means, a catalyzer, and a dephlegmator serially connected together in the order named, conduits connecting the condensate outlet of each of said dephlegmators with the vaporizer of the next unit, including a connection between the condensate outlet of the last unit and the vaporizer of the first unit of the plant, whereby a closed circuit is formed through said units, means whereby any of said units may be disconnected from the closed circuit leaving the remaining units connected together as an operating series, conduits connected to each dephlegmator for withdrawing material from the circuit, a supply line, and conduits connecting said supply line to each of said vaporizers to supply material to be treated to the circuit.

4. In a continuous process of cracking oils catalytically wherein oil vapors are conducted through a plurality of cracking units serially arranged to form a continuous vapor path, each unit containing a catalyst to crack the vapors, the activity of which catalyst decreases as the cracking continues, the steps of conducting the uncracked starting vapors over the catalyst of one unit, then dephlegmating the vapors and separating the useful cracked productes from the others, then vaporizing the remaining products and passing them over the catalyst of a second unit having a higher degree of activity than the first one, dephlemating and separating the useful cracked products, continuing the successive vaporizing, cracking, dephlegmating and separating operations in a plurality of serially connected units having catalysts of successively increasing activity, then conducting the uncracked starting vapors directly to the catalyst of the second unit in the series when the catalyst of the first unit therein becomes exhausted and simultaneously connecting a unit having a regenerated catalyst to the last unit of the previously operating series, and regenerating the exhausted catalyst of said first unit, thereby effecting a continuous cracking of said vapors by a cyclic permutation of said cracking units.

In testimony whereof I have signed this specification.

ALFRED JOSEPH.